United States Patent [19]

Muramatsu et al.

[11] Patent Number: 5,177,729
[45] Date of Patent: Jan. 5, 1993

[54] METHOD AND APPARATUS FOR READING INFORMATION ON INFORMATION RECORDING MEDIUM HAVING TRACK STRUCTURE

[75] Inventors: Eiji Muramatsu; Takanori Maeda, both of Saitama, Japan

[73] Assignee: Pioneer Electronic Corporation, Tokyo, Japan

[21] Appl. No.: 524,931

[22] Filed: May 18, 1990

[30] Foreign Application Priority Data

Jul. 10, 1989 [JP] Japan ................................. 1-177623

[51] Int. Cl.⁵ .............................................. G11B 20/10
[52] U.S. Cl. ........................................ 369/59; 369/32; 369/44.32; 358/342; 358/312; 358/907
[58] Field of Search ...................... 358/342, 312, 907; 369/32, 44.28, 47, 48, 51, 59, 60, 61, 62, 44.25, 44.26, 44.27, 44.28, 44.32, 111; 371/37.5, 5.1, 13, 40.1; 360/10.1

[56] References Cited

U.S. PATENT DOCUMENTS

| | | | |
|---|---|---|---|
| 4,414,584 | 11/1983 | Kurata | 358/907 |
| 4,425,587 | 1/1984 | Kurata | 358/907 |
| 4,536,864 | 8/1985 | Van Rosmalen | 369/111 |
| 4,587,643 | 5/1986 | Monen et al. | 358/907 |
| 4,680,764 | 7/1987 | Suzuki et al. | 371/37.5 |
| 4,796,247 | 1/1989 | Vogelsang | 369/44.32 |
| 4,964,128 | 10/1990 | Sako et al. | 371/50.1 |
| 5,068,856 | 11/1991 | Nagasawa et al. | 371/35.5 |

Primary Examiner—Tommy P. Chin
Assistant Examiner—Huy Nguyen
Attorney, Agent, or Firm—Sughrue, Mion, Zinn, Macpeak & Seas

[57] ABSTRACT

A method of and apparatus for reading information, including error correction codes, is disclosed recording information is read out from one track a plurality of times at a reading velocity not lower than at least twice a normal velocity. On the basis of the plural pieces of information read out, the respective quantities of read errors contained in pieces of information are compared with each other so that one of the pieces of read-out information having the minimum quantity of read errors is selected. Accordingly, the selected information to be supplied to the error compensation circuit is the information having the minimum error rate in the sense of probability so that the compensated output further approaches the correct value.

8 Claims, 3 Drawing Sheets

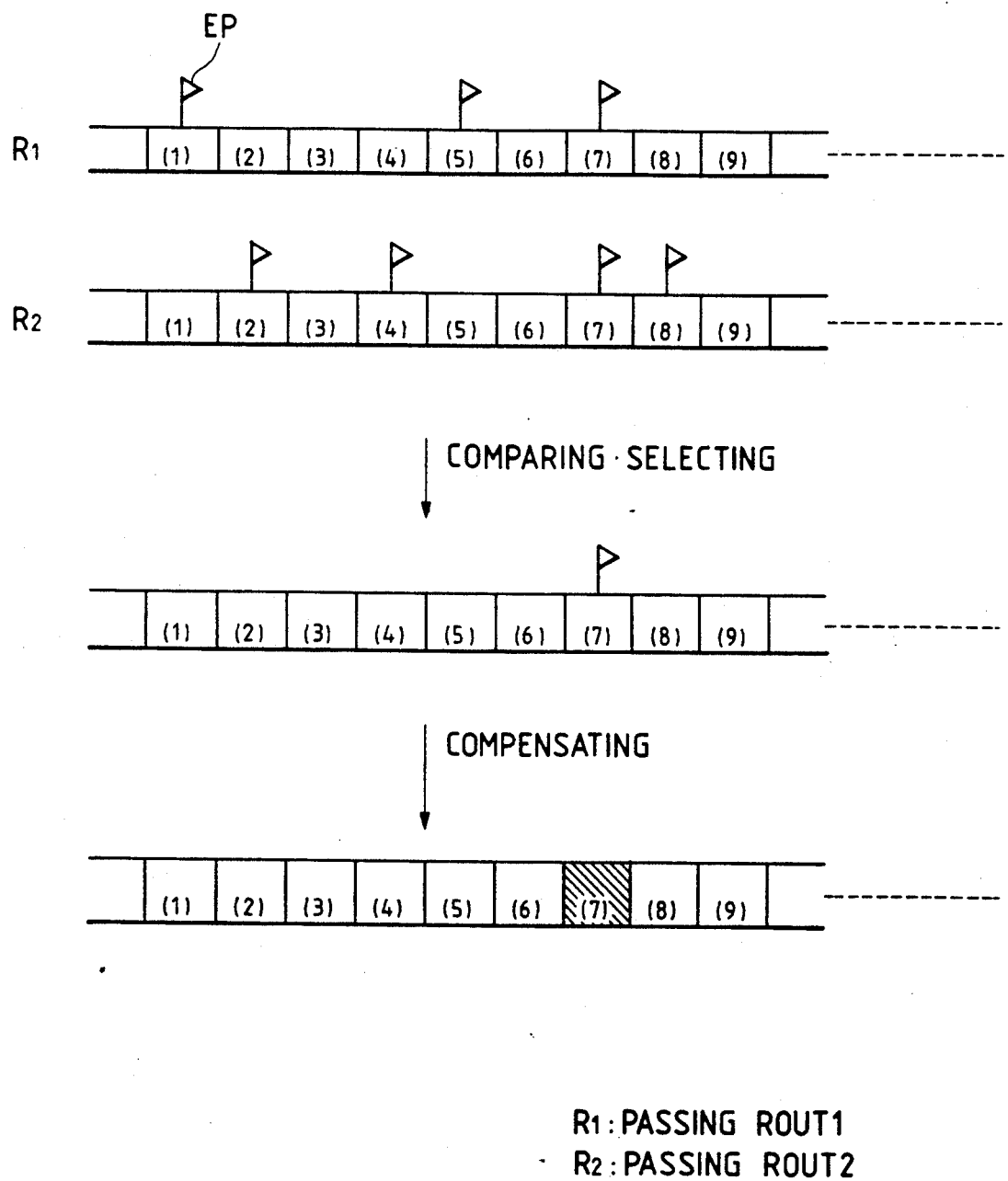

METHOD AND APPARATUS FOR READING INFORMATION ON INFORMATION RECORDING MEDIUM HAVING TRACK STRUCTURE

FIELD OF THE INVENTION

The present invention relates to a method and an apparatus for reading recording information from an information recording medium, such as a compact disk (CD), a laser vision disk (LVD), or the like, on which recording information has been recorded in a spiral track, and particularly relates to an information reading method of reducing the rate of read errors.

BACKGROUND OF THE INVENTION

Generally, information is recorded on an optical disk at a certain normal velocity (line velocity or angular velocity), and the information is continuously recorded in a spiral track in the state where pieces of the information are arranged in a time series order. When the recording information is read out from such an optical disk so as to be reproduced, the read-out signal from the optical pickup is output as a reproducing signal in real time.

However, there is no guarantee that the recording information is always correctly read out. This is because there is a probability that a disk is damaged in a process of mastering or manufacturing the disk, or is damaged while the disk is in use. In the case where the injure exceeds a permissible limit, the recorded "0" or "1" of the recorded digital signal may be erroneously read out.

In the CD system, a CIRC (Cross Interleave Read-Solomon Code), is used as an error correcting code. The CIRC is a combination of a read-solomon code which is an error correcting code having high random error correcting capability, and means for converting a burst error (a long drop-out) into a random error by interleaving. The interleaving is effective to disperse the burst error caused by damage or the like of a disk to thereby improve the efficiency in correction. That is, erroneous data is dispersed by deinterleaving so that the erroneous data can be corrected on the basis of other correction data.

However, even if the CIRC method is used, sometimes correction becomes impossible when a large quantity of data is made erroneous by severe damage to the recording medium. If the erroneous data are output then noises are caused or shock sounds are generated from a speaker depending on the location of the error bits.

Then, it is desired to produce data approximate to the correct value even if the data is not perfectly correct. For this purpose, an erroneous data compensation circuit such as a preceding-value holding circuit in which a value immediately before erroneous data is repeatedly output or an average-value interpolation circuit in which an average value of correct data immediately before and after erroneous data is output as compensated data.

In the case where it is desirable to reduce the generation of noises or shock as much as possible, it is desirable that the read-out information per se, which is to be supplied to the erroneous-data compensation circuit, has the lowest possible error rate so that more improvement in the quality of information may be expected.

SUMMARY OF THE INVENTION

It is an object of the present invention to provide a method of reading information from an information recording medium having a track structure in a low read error rate.

In order to solve the problems in the prior art, according to the present invention, the method of reading information from a recording medium having a track structure and carrying the information including error correction codes and being arranged in time series order, the information being recorded in a spiral track of the medium at a normal velocity, comprises the steps of: reading the same track a plurality of times at a reading velocity not lower than at least twice of the normal velocity; comparing respective quantities of read errors contained in the pieces of information of the same track read-out plural times with each other; selecting one of the pieces of read-out information having the minimum quantity of read errors among the compared pieces of read-out information; and outputting the selected piece of read-out information as digital information arranged in time series order.

According to the present invention, recording information is read out repeatedly from the same track of the information recorded medium at a reading velocity not lower than twice of the normal velocity. On the basis of the plural pieces of information read out from the same read track, the respective quantities of read errors contained in the pieces of read-out information are compared with each other so that one of the pieces of read-out information having the minimum quantity of read errors is selected. Accordingly, the read-out information to be supplied to the error compensation circuit is the information having the minimum error rate in the sense of probability so that the compensated output further approaches the correct value.

BRIEF DESCRIPTION OF THE DRAWINGS

FIG. 4 is a view for explaining the compensation operation.

DETAILED DESCRIPTION OF PREFERRED EMBODIMENT

Figure 1:
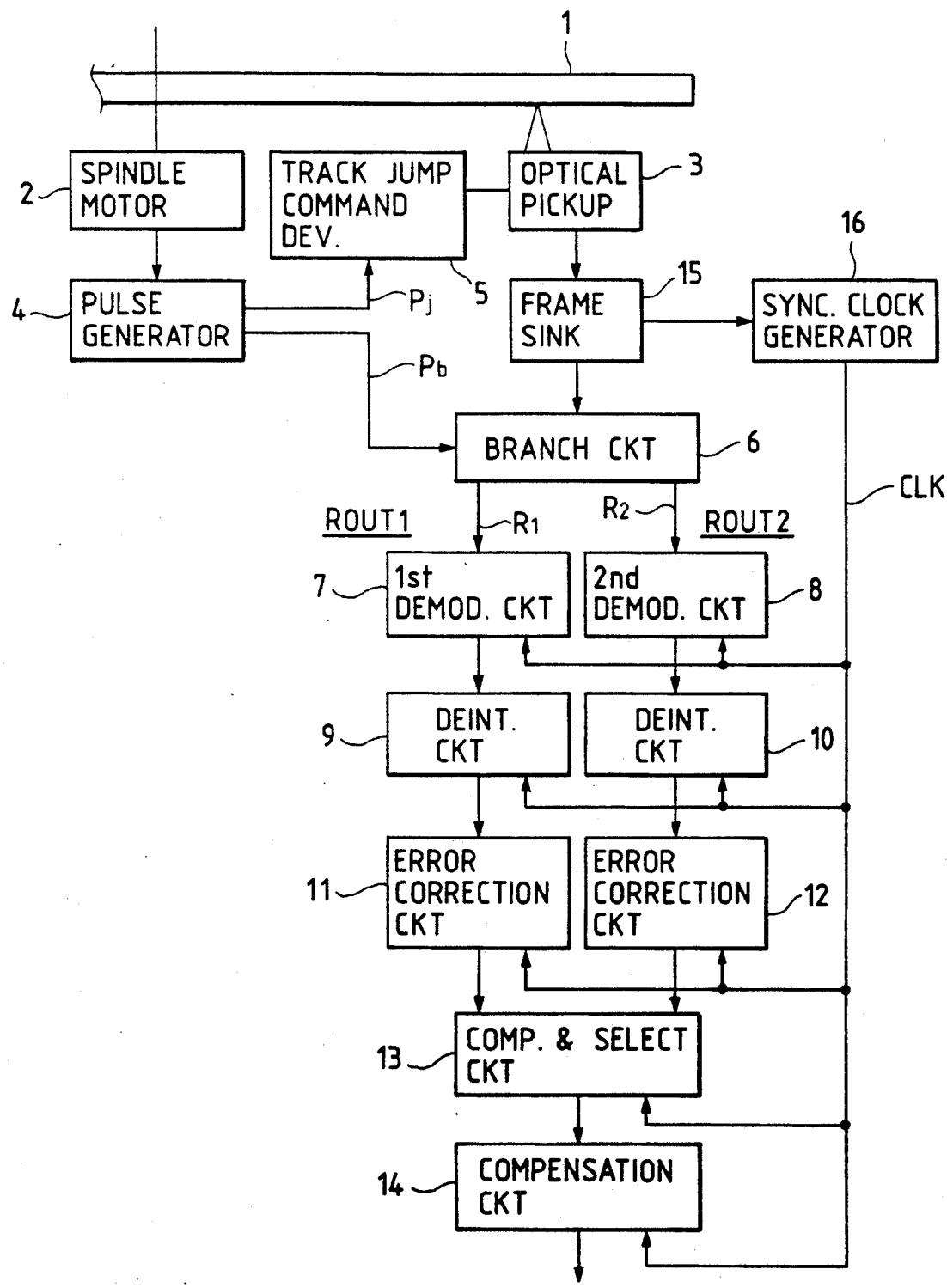
FIG. 1 is a block diagram showing an embodiment of the present invention.

Referring to the drawings, an embodiment of the present invention will be described hereunder.

FIG. 1 is a block diagram of a reading apparatus for embodying the present invention. In FIG. 1, an optical disk 1 is being rotated by a spindle motor 2 at a predetermined scanning velocity, and a track is being scanned by an optical spot emitted by an optical pickup 3, so that a signal is read out. A pulse generator 4 receiving information of rotation from the spindle motor 2 feeds out pulses $P_j$ and $P_b$ to a track jump command device 5 and a branch circuit 6, respectively. The track jump command device 5, receiving the pulse $P_j$, supplies a command to the optical pickup 3 so as to control a track jump operation of the optical spot. On the other hand, the branch circuit 6 receiving the pulse $P_b$ feeds out the information read-out by the optical pickup 3 to either a first demodulating circuit 7 or a second demodulating circuit 8. Each signal passed through demodulation circuit paths ROUT 1 or ROUT 2 is fed to a comparing and selecting circuit 13 through a deinterleaving circuit 9 and an error correction circuit 11, or through another deinterleaving circuit 10 and another error correction circuit 12 so as to be compared and selected. The compared and selected signal is fed to a compensation circuit 14. The compensation circuit 14 applies compensation processing upon the signal in accordance with a previously set procedure and outputs a compensated signal. A frame sink detecting circuit 15 detects a frame sink from the read out signal from the pickup 3. The detected frame sink is supplied to the branch circuit 6 so as to be used as a synchronization signal which is required upon the demodulation by the first and second demodulating circuits 7 and 8. Further, the detected frame sink is also supplied to a synchronization clock generator 16 for generating a clock signal synchronized with the frame sink. The clock signal is supplied to each circuit of the demodulation circuit paths ROUT1 and ROUT2, the comparing and selecting circuit 13, and the compensation circuit 14.

Next, the operation will be described. Description will be made as to an example in which the present invention is applied to a CD player.

Figure 2:
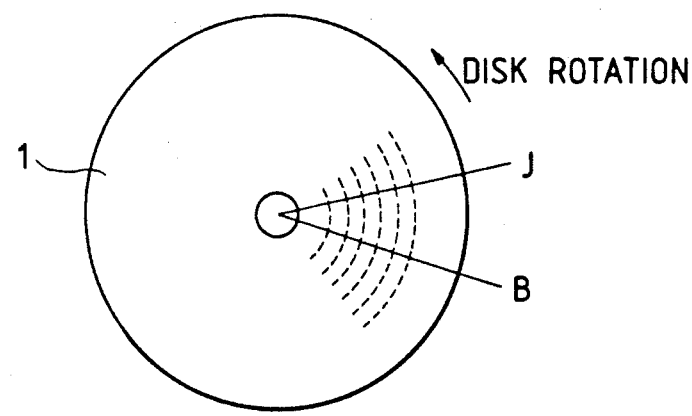
FIG. 2 is a view for explaining a jump command position and a branch command position on an optical disk.

First, as shown in FIG. 2, a jump command position J is set on a radial straight line of the optical disk 1, and a branch command position B is set on the optical disk 1 at a position separated from the jump command position J by a predetermined rotation angle.

The optical disk 1 is controlled to rotate so that the linear scanning velocity in the will not be lower than twice (for example, three-fold) as high as the normal velocity (1.2 m/s—1.4 m/s).

Figure 3:
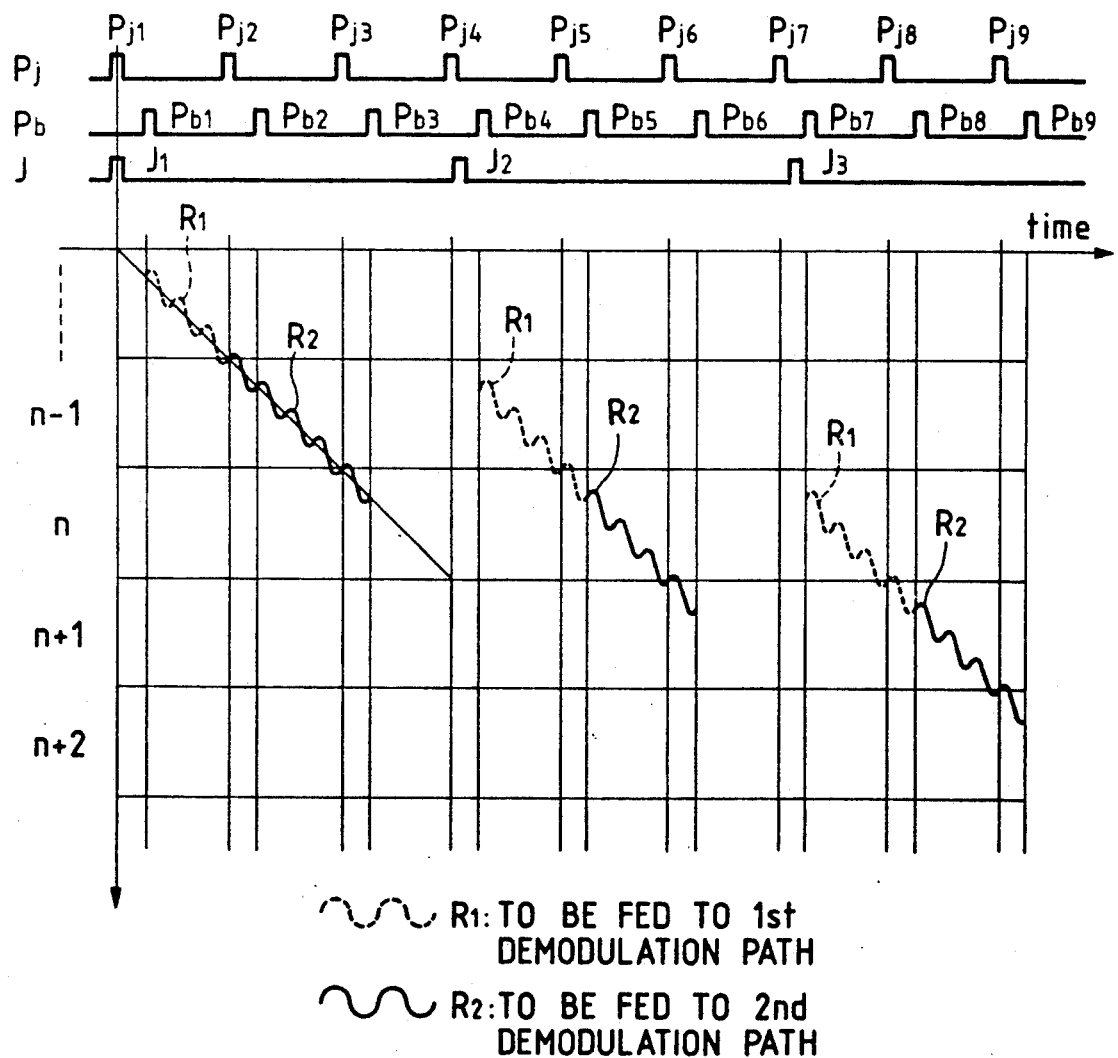
FIG. 3 is a view for explaining the operation.

As shown in FIG. 3, the pulse generator 4 obtains the rotation information from the spindle motor 2 and feeds a pulse $P_{j1}$ to the jump command device 5 when the optical spot has reached the jump command position J.

The jump command device 5 gives a command to the optical pickup 3 upon receiving the pulse $P_{j1}$ three times so that the light spot jumps to a track located inside by two circumferences.

The branch command position B is located at a position where it can normally scan the track after completion of the track jump operation.

Upon detection of arrival of the optical spot at the branch command position B on the basis of the rotation information, the pulse generator 4 feeds a pulse $P_{b1}$ to the branch circuit 6. The branch circuit 6 receiving the pulse $P_{b1}$ feeds a signal $R_1$ read-out by the optical pickup 3 to the first demodulating circuit 7. Upon reception of a succeeding pulse $P_{b2}$, the branch circuit 6 stops feeding the signal $R_1$ and immediately succeedingly begins to feed a signal $R_2$ to the second demodulating circuit 8. Then, upon reception of a pulse $P_{b3}$, the branch circuit 6 terminates feeding the signal $R_2$.

The signals $R_1$ and $R_2$ passed through the two different demodulation paths are EFM-demodulated by the demodulating circuits 7 and 8, respectively, and then fed to the deinterleaving circuits 9 and 10 so as to be deinterleaved.

Next, as shown in FIG. 4, the signals $R_1$ and $R_2$ are subjected to error detection and error correction in the error correction circuits 11 and 12, respectively. The signals $R_1$ and $R_2$ are fed to the comparing and selecting circuit 13, while error pointers EP are added onto symbols which could not be corrected. The comparing and selecting circuit 13 ordinarily feeds the signal through the ROUT 1 (or ROUT 2) starting from the first demodulating circuit 7 to the compensation circuit 14. In the case of the signal containing symbols with error pointers EP, the comparing and selecting circuit 13 feeds the signal to the compensation circuit 14 after substituting the symbols provided with the error pointers EP by the same symbols of the signal passed through the ROUT 2 (or ROUT 1). The compensation circuit 14 performs compensation processing such as interpolation compensation, preceding-value hold compensation, or the like, and outputs a correct value in accordance with the previously set procedure.

Through the operation described above, a reproducing apparatus reads out the same signal two times and selectively outputs the more preferable signal of the two signals.

Here, the effects obtained through the configuration described above will be discussed.

First, the case where the error in reading signals is caused only by the performance of an optical system, that is, the case where the probabilities of occurrence of the read error are equal to each other in any positions on the optical disk 1 will be discussed. Assume that complete reproduction of a disk is defined to be as "the case where no compensation processing has been performed in reproduction" (definition 1). Then, the probability $I_1(x)$ of performing compensation-processing on x signals among n read-out signals is given as follows.

$$I_1(x) = {_nC_x} a^x (1-a)^{n-x}$$

In the above expression, a, x, and n represent the probability of performing compensation-processing on arbitrary signals, the number of signals subjected to the compensation-processing, and the number of the read-out signals, respectively.

Assuming that the number n of the read-out signals is sufficiently large, and the probability a of performing the correction processing is sufficiently small, and $na = \lambda$, the following approximate expression can be obtained.

$$I_1(x) \simeq \frac{\lambda^x}{x!} e^{-\lambda}$$

Next, assuming now that it is defined that "a signal has been subject to compensation processing only when the same signal is read twice and the compensation-processing is required for both read signals", (definition 2). Then, the probability of performing compensation-processing on a signal is $a^2$. The probability $I_2(x)$ of performing compensation-processing on x signals among n signals each of which are read twice is as follows.

$$I_2(x) = {_nC_x} a^{2x} (1-a^2)^{n-x}$$

Similarly to the above case, assuming that n is sufficiently large, and $a^2$ is sufficiently small, and $na^2 = a'$, the following approximate expression can be obtained.

$$I_2(x) \simeq \frac{\lambda'^x}{x!} e^{-\lambda'}$$

To completely reproduce a disk, $x = 0$ from the definition 1. Accordingly, the above probabilities are expressed as follows.

$$I_1(0) = e^{-\lambda}$$

$$I_2(0) = e^{-\lambda'}$$

Now, specifically, assuming that $I_1(0) \simeq 0.05$ (that is, assume an optical system in which a disk can be completely reproduced with a probability of 5% when the disk is reproduced in the ordinary reproducing method (once reading)), then the following expressions are obtained.

$$\lambda = 3, \therefore \lambda' = \frac{9}{n}, I_2(0) = e^{-9/n}$$

For example, in the case of n=90, then $I_2(0) \simeq 0.9048$ (n>90 in an actual disk).

In the above discussion, it has been considered that n is sufficiently large and a is sufficiently small on the assumption that the probability of read error occurrence is fixed in any position. However, even the case where the rate of read error occurrence varies on a disk can be coped with if the surface of the disk is divided into a number of minute areas each satisfying the conditions of the above discussion and n and a are determined for every minute area. This means that not only an error in which the cause is in the optical system can be reduced but a read error the cause of which is the disk side can be reduced.

Although the above description has been made, by way of example, using a CD player, the present invention can be similarly applied to any disk-like recording medium so long as the medium has a spiral track structure that, carries a time-serially continuous digital signal recorded thereon. Further, although the above embodiment has been described, by way of example, as to the case where the scanning velocity is made three-times as high as a normally velocity, the present invention can be applied to even when the scanning velocity is made to be not lower than two times, for example, 2.5 times. In the case of the example, it will do to make three tracks be returned every five tracks. That is, generally, it is possible to cope with if the operation is determined so that scanning is made at a-times velocity and n tracks are jumped toward inner circumference side for every m tracks (where m−m/a=n; m, n, and m/a are natural number). Further, although the case where the signals are compared and selected for every symbol thereof has been described above by way of example, the present invention is not limited to the case, but is applicable, for example, to the case where a signal having a smaller error rate is selected for every frame.

Further, in addition to the operation described above, it is possible to consider a case where a reading condition, for example, the value of a focus offset or tracking gain of a servo, is changed between the first and second times, and so on.

The operation of the present invention can be combined with that of conventional systems.

As described above, according to the present invention, one and the same signal is read out twice or more at a scanning velocity which is not lower than twice as high as a normal velocity, and the read-out pieces of information are compared so that the information having the minimum error rate is selected and output. Thus, a signal having a low rate of read error can be put out.

What is claimed is:

1. A method of reading digital information recorded on at least one spiral track of an information recording disk at a normal rotating speed, said reading method comprising the steps of:

rotating said information recording disk at a reading rotating speed not lower than twice said normal rotating speed;

repeatedly reading one track of said recording disk a plurality of times at said reading rotating speed to generate a plurality of respective read information pieces;

respectively distributing said plurality of read information pieces into a plurality of demodulating means;

subjecting said distributed read information pieces to error detection and error correction;

comparing respective amounts of said error detected and corrected distributed read information pieces;

selecting one of said distributed plurality of read information pieces having minimum error relative to the remaining distributed plurality of read information pieces; and compensating said selected one of said distributed plurality of read information pieces.

2. The reading method as claimed in claim 1, wherein said reading step comprises the step of jumping n tracks toward an inner circumference side of said recording disk for every m tracks at a-times of said normal speed, where a=(reading rotating speed)/(normal rotating speed), m−m/a=n; m, n, and m/a are natural numbers.

3. A method of reading information, which is recorded in at least one spiral track of a recording medium at a normal velocity and is arranged in time series order, said method comprising the steps of:

repeatedly reading one track of said recording medium a plurality of times at a reading velocity not lower than twice said normal velocity, and generating a plurality of pieces of information corresponding to each time said one track is read;

comparing respective quantities of read errors contained in said pieces of information of said one track with each other;

selecting one of said pieces of information having the minimum quantity of read errors among the compared pieces of information; and outputting said selected piece of information as digital information arranged in time series order.

4. An apparatus for reading digital information recorded on a spiral track of an information recording disk at a normal rotating speed, said digital information consisting of information blocks including error correction codes, said reading apparatus comprising:

means for rotating said information recording disk at a reading rotating speed not lower than twice said normal rotating speed;

means for reading one track of said recording disk a plurality of times at said reading rotating speed, and for generating a plurality of respective read information blocks;

distribution circuit for respectively distributing said plurality of read information blocks into a plurality of demodulating means, said demodulating means including an error correcting circuit for subjecting each block of said read information to error detection and error correction based on said error correction codes;

means for comparing respective amounts of error of said plurality of blocks;

means for selecting a block having a minimum error relative to the remaining plurality of blocks; and compensation circuit for compensating said selected block.

5. An apparatus for correcting information read from a recording medium having said information recorded at a first velocity on at least one track, said recording medium being reproduced by a recording/reproducing player, said apparatus comprising:

rotating device rotating said recording medium at a second velocity at least twice said first velocity;

reading device reading said information recorded on said recording medium at least two times at said second velocity, and generating at least two reading information pieces respectively corresponding to said at least two times;

at least two error detection/correction circuits, coupled to said reading device, respectively receiving said at least two information pieces, detecting errors within each information piece, and correcting such errors when possible; and compare/selection device, coupled to said error detection/correction circuits, comparing the number of errors for each of said at least two information pieces that could not be corrected by said error detection/correction circuits, selecting one of said at least two information pieces that has the lowest number or errors that could not be corrected.

6. The apparatus of claim 5, wherein each of said two information pieces contains a plurality of symbols that are identified by error pointers when such symbols cannot be corrected by said error detection/correction circuits, said compare/selection device detecting said error pointers in said selected one of said at least two information pieces and replacing each symbol identified by said error pointer with corresponding correct symbols from the remaining selected at least two information pieces that were not selected.

7. The apparatus of claim 6, further comprising a compensation circuit, coupled to said compare/selection device, performing compensation processing such as interpolation compensation on said selected one of at least two information pieces.

8. The apparatus of claim 7, wherein said at least two information pieces contain error correcting codes that are used by said error detection/correction circuits to detect and correct errors in each of said information pieces using processes such as a Cross Interleave Read-Solomon Code error detection and correction process.

* * * * *